Oct. 16, 1956     F. W. SCHWINN     2,767,002
MEANS FOR JOINING TUBULAR PARTS
Filed Sept. 15, 1953     2 Sheets—Sheet 1
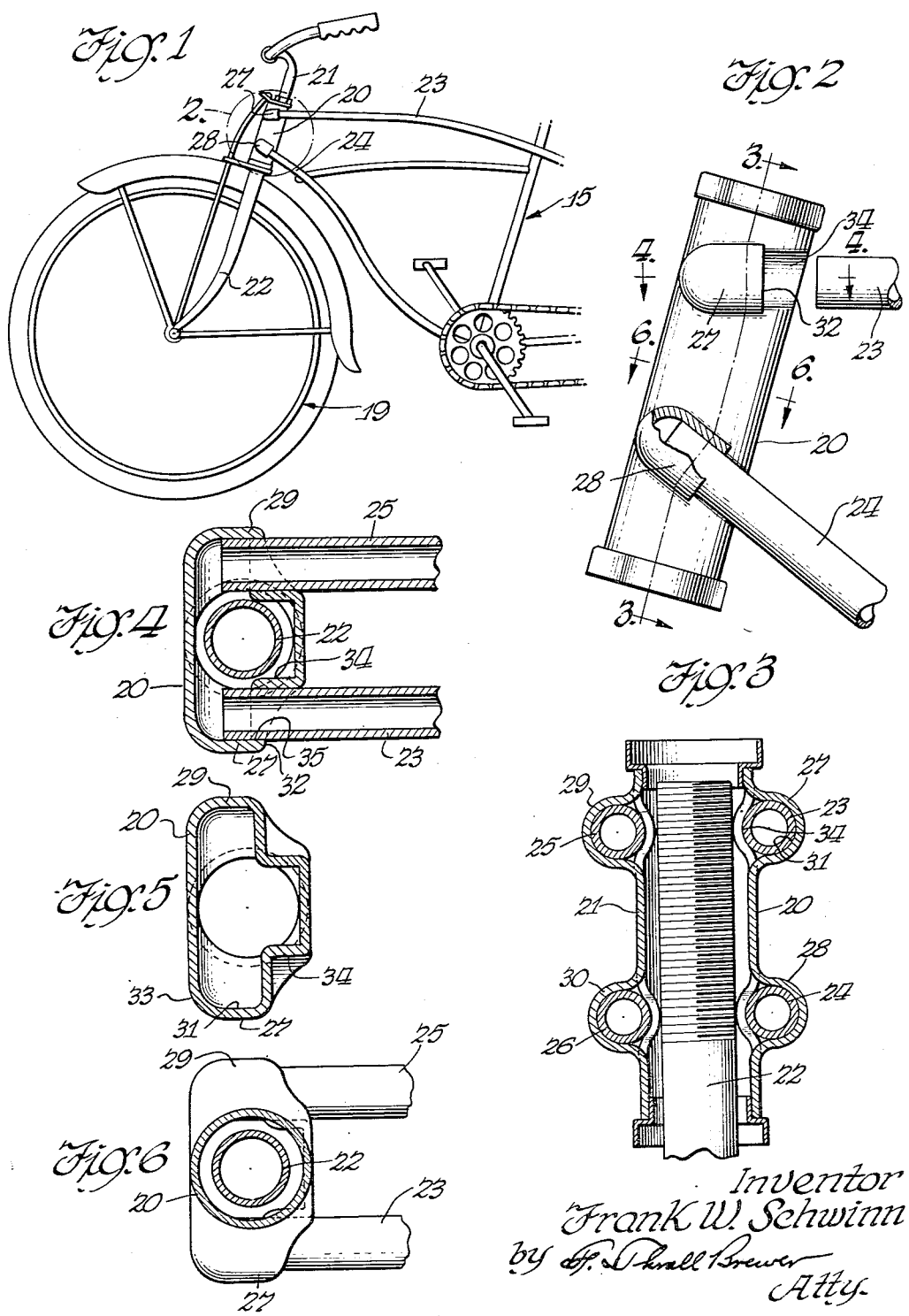
Inventor
Frank W. Schwinn
by F. Snell Brewer
Atty.

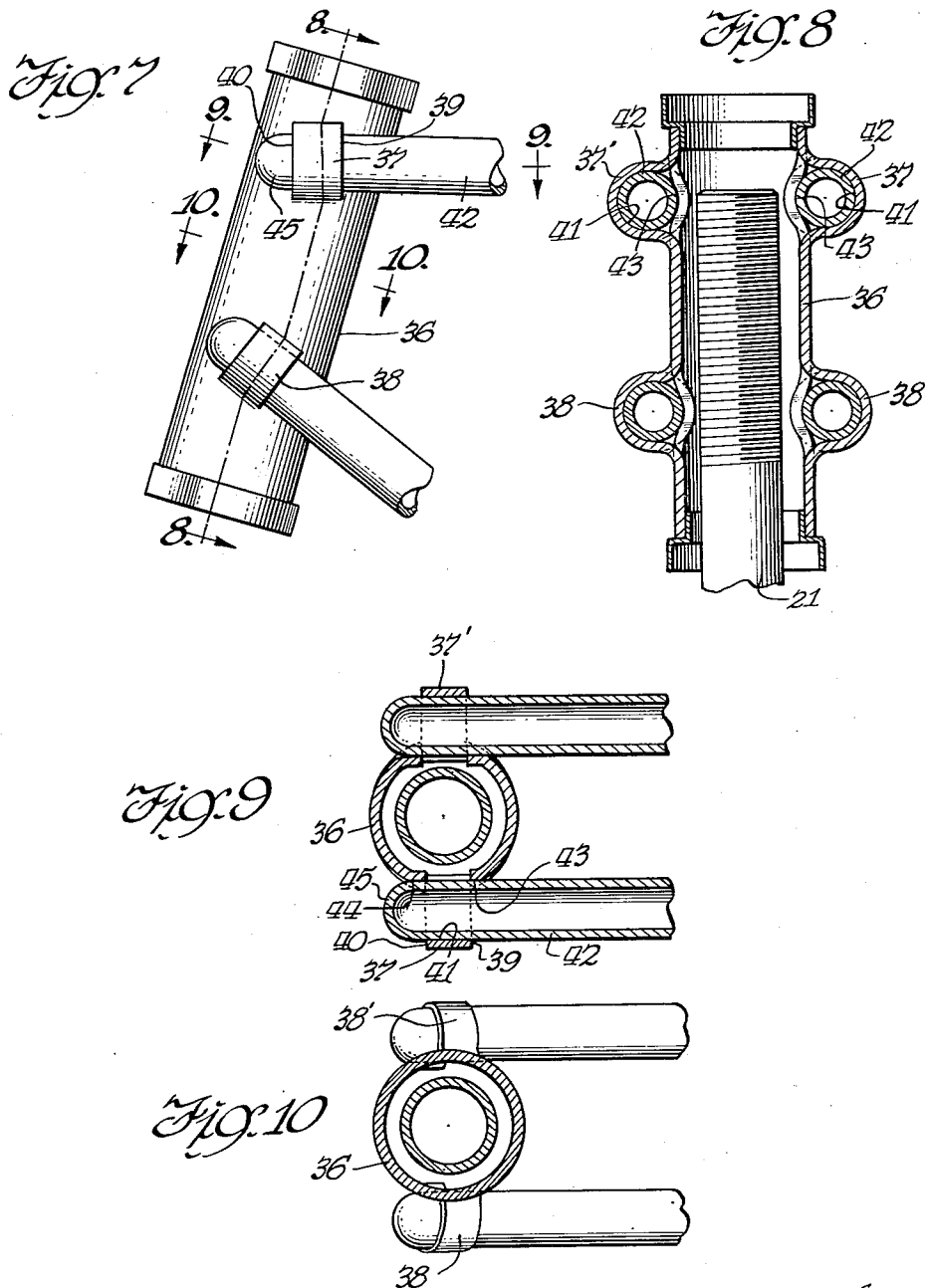

United States Patent Office 2,767,002
Patented Oct. 16, 1956

2,767,002

MEANS FOR JOINING TUBULAR PARTS

Frank W. Schwinn, Chicago, Ill.

Application September 15, 1953, Serial No. 380,187

7 Claims. (Cl. 287—54)

This invention relates to devices fabricated from tubular parts, with particular reference to means for joining such parts, and will be described as applied to the fabrication of certain portions of a bicycle frame, but it is to be understood that the invention is not necessarily limited to the bicycle art, even though it has a particular adaptation thereto.

Many devices are now being manufactured which, for purposes of strength or appearance or both, are preferably made from a number of tubes connected together in some permanent manner to form a given structure. One of the best illustrations of such structures is the well-known bicycle frame which is almost entirely an assemblage of tubes of various sizes welded or brazed together at predetermined angles to form the frame on which are mounted the wheels, driving sprocket, seat, steering mechanism, etc.

Other examples of devices fabricated from tubular parts are chairs, tables, scaffolding and structural frames. In some instances it has been customary to unite two tubes by cutting an opening in one of the tubes of a size sufficient to receive the other tube therein and then brazing or welding the two tubes together along their engaging surfaces. In other instances, protrusions or flanges are provided on the side wall of one frame which extend into an adjoining tube, thereby providing overlapping portions which may be secured together by brazing or welding. Although these methods of uniting two tubes have been and still are quite successful, particularly where the axes of the tubes intersect, it has been considered desirable from the standpoint of greater strength at the brazed or welded joint, to increase the area of contact between the two tubes, so that there will be greater surface-to-surface contact rather than what might be termed a narrow band contact. Furthermore, it has been deemed advantageous so to relate the contacting surfaces that a mechanical lock will be effected between the tubes which will hold them together independently of the weld or brazing material. This is particularly true where the tubes are to be united in such a manner that their axes do not intersect, that is, in such manner that, in effect, the side of one tube is connected or secured to the side of the other tube. In the latter instance, it will be appreciated that the two tubes will have contact over a point or small circle rather than over a band, and that therefore a rather weak joint, dependent entirely on the strength of the bonding material, will result.

This invention has for one of its principal objects the provision of a joint between two tubular members which are to be united in a manner such that their axes do not intersect, the joints nevertheless providing substantial areas of contact between the two tubes and being so constructed that at least a partial mechanical lock is effected between them.

As another object, this invention seeks to provide a device fabricated from tubular parts, one of said parts having its surface formed in a die to provide a cylindrical opening within which the other tubular member may be received, said forming operation being less expensive than the hole-cutting or flange forming operations heretofore employed and less wasteful of material.

A further object of this invention is to provide a bicycle frame or the like fabricated from tubular parts, and wherein the tubular parts constitute the steering head and one of the frame tubes disposed relative to one another in a manner such that the axes of the tubular parts do not intersect, and wherein the steering head is die-formed to provide surfaces on opposite sides of the frame tube against which said frame tube may bear and to which it may be permanently secured by brazing or welding.

My invention has for another object the provision of a joint between a frame tube and a steering head tube of a bicycle frame wherein wall portions of the head tube are deformed in opposed directions to provide surfaces which conform to opposed and substantial side portions of the frame tube at positions spaced longitudinally of the frame tube.

This invention also has for its general object the provision of a permanent structure fabricated from tubular parts which is generally stronger than those heretofore available and which is more economical to make in that it reduces waste and assembly costs.

These and other objects of this invention will become apparent from the following detailed description when taken together with the accompanying drawings in which:

Fig. 1 is a fragmentary side elevational view of an illustrative embodiment of this invention, the embodiment including the forward part of a bicycle frame;

Fig. 2 is an enlarged view of the portion of Fig. 1 enclosed within the dotted circle marked "2" and showing one frame tube prior to its assembly with the head tube, and another frame tube assembled with the head tube but with a portion of the structure cut away;

Fig. 3 is a front sectional view of the portion of the bicycle frame shown in Fig. 2, the section being taken substantially along a line 3—3 thereof;

Fig. 4 is a top sectional view of an assembled head tube and frame tubes taken along a line corresponding with line 4—4 of Fig. 2;

Fig. 5 is a cross section taken through the head tube before the openings for the frame tubes have been made therein;

Fig. 6 is a top sectional view of the head tube of Fig. 2 wherein the section is taken substantially along the line 6—6 of Fig. 2;

Fig. 7 is a side elevational view of a modification of this invention, the modification being again applied to a head tube of a bicycle, such as is shown in Fig. 2.

Fig. 8 is a front sectional view of a head tube assembled with frame tubes, the section being taken substantially along a line 8—8 of Fig. 7;

Fig. 9 is a top sectional view of the head tube of Fig. 7, with the section taken substantially on a line 9—9 thereof; and Fig. 10 is another top sectional view of the head tube of Fig. 7, wherein the section is taken along a line 10—10 thereof to show the assembly of the lower frame tubes with respect to the head tube.

Referring to the drawings for a detailed description of the invention, there is shown in Fig. 1 the forward part of a bicycle having a frame 15 which includes a head tube 20 within which are received a steering post 21 which extends from a fork 22, in which fork a front wheel 19 of the bicycle is supported for rotation. Secured to one side of the head tube 20 are frame tubes 23 and 24 which are spaced longitudinally of the head tube and angularly disposed relative to one another. Corresponding frame tubes 25 and 26 are secured to the opposite side of head tube 20 in diametrically opposed relationship to the frame tubes 23 and 24 respectively.

Head tube 20 has bosses 27, 28, 29 and 30 (Fig. 3) formed in the sides thereof. Each boss has a semi-cylindrical inner surface 31, the diameter of which is substantially equal to the outside diameter of one of the frame tubes, such as 23 (Fig. 3). As shown in Fig. 2, each boss, in addition to being substantially semi-cylindrical over a portion of its length, terminates in a substantially frusto-spherical portion 33 which closes that end of the boss and prevents the entry of dirt and foreign matter into the head tube.

Adjacent the end 32 of each boss 27, 28, 29 and 30, the side of head tube 20 is depressed to form a cylindrically contoured surface 34, the radius of which is substantially equal to the radius of the outer surface of one of the frame tubes. Such surface 34 is axially aligned with boss 27 and when viewed in cross section, as, for example, in Fig. 3, forms a continuation of the cylindrical surface 31, but is on the exterior surface of the head tube at a position displaced axially of the frame tube from the surface 31.

In the illustrated embodiment of this invention, the head tube 20 receives the steering post 21 in a manner with clearance to allow such steering post to rotate freely within tube 20. It is important that tube 20 be not deformed radially inwardly at surface 34 so much that it interferes with the free operation of steering post 21. For this reason, the axis of frame tube 23 is not tangent to the surface of tube 20, but is disposed a small distance outside that surface. It is contemplated, however, that the radial distance of the axis of frame tube 25 from the center of tube 20 may be varied to suit particular situations or structures, so that if desired, the axis may be considerably within a tangent to the outer surface of tube 20, or may assume any one of a number of positions within, tangent to, or outside of, tube 20. It will be understood, of course, that for positions of frame tube 23 closer to the center of tube 20, the depth of surface 34 away from the normal surface of the tube 20 will increase and the extension of boss 27 from surface 20 will decrease.

Frame tube 23 is assembled with respect to tube 20 by the insertion of said frame tube 23 into the boss 27, with the outer surface of frame tube 23 resting against the depressed surface 34 in tube 20. The other frame tubes are assembled with the head tube in a like manner. The intersecting surfaces of frame tubes and the surfaces on tube 20, including the depressed surface 34 and the end 32 of boss 27, may then be united by a bonding material, preferably by a brazing operation. In this operation the uniting metal is flowed between the contacting surfaces of frame tubes and head tube 20, and because of the substantial area of contact between these tubes, as compared to the line contact usually obtained in a butt joint, a much stronger union is effected. The joint provided in my disclosed structure is also stronger mechanically because of the relationship of parts, and independently of the brazed connection thereof, as, for example, when forces tend to bend frame tube 23 relative to head tube 20 in a counterclockwise direction as viewed in Fig. 4, a mechanical lock and bracing action is afforded which resists such bending, even though the brazing material is absent. This, of course, is not true of a butt joint of the usual type.

Obviously, the number of tubes which may be united with a single tube is limited only by the space available along the single tube. In a bicycle of the type shown in Fig. 1, four such tubes are desirable and the tubes may be disposed at any desired angle with respect to the axis of the head tube 20. Each of the tubes may be united to head tube 20 in exactly the same manner.

Head tube 20 may be formed as a stamping from sheet stock which is blanked, curled into a cylinder and then butt welded or brazed to form the continuous head tube shown in Figs. 1, 2 and 3. It can also be formed from a seamless tube, but this involves a more complicated die which is expanded to form the bosses, after which it is contracted to permit it to be withdrawn from the formed tube. Thus the tube will be drawn out by suitable dies to have the cross section shown in Fig. 5 by which surface 33, as well as surface 31 and the end 32 of boss 27, are formed. Surfaces 31 and 34, however, are connected by the deformed portion of tube 20, and this portion is then operated upon by a circular punch to form the opening into which frame tube 23 may be inserted.

Fig. 4 shows the frame tubes assembled with the head tube 20 and brazed together. It may be noted that whereas there is circumferential contact of practically 360° between the frame tube 23 and the head tube 20 over a narrow zone indicated generally at 35 in Fig. 4, the arc of contact between these tubes decreases axially along the frame tube 23 on either side of the zone and the axial area of contact correspondingly increases, so that there is a substantial area of contact between the tubes over adjacent zones which gradually diminishes from front to rear along the frame tubes. For a good brazed joint, a substantial area of contact between the surfaces to be united is highly desirable and provides a much stronger joint in substantially all directions of force tending to move a frame tube relative to a head tube.

A modification of the joint shown in Figs. 1 to 6 inclusive is illustrated in Figs. 7 to 10 inclusive. In this modification the bosses are open at both ends effectively to form an eye through which frame tubes with closed ends are inserted. The adjacent surfaces of the head tube on each side of the boss are depressed to form a continuation of the cylindrical surface formed by the inside surface of the boss.

Referring to Figs. 7 and 8, a head tube 36 has bosses 37, 38, 37' and 38' formed in the sides thereof, which bosses have open ends 39 and 40 of a generally semi-cylindrical form. Thus, an inner surface 41 of boss 37 is substantially identical in size and shape to the external surface of a frame tube 42, and provides a substantial area of contact between the inner surface 41 and the external surface of the frame tube 42. At each end of boss 37, the head tube 36 is depressed, as at 43 and 44, to provide surfaces of cylindrical contour, the radii of which are substantially equal to the radius of the outer surface of frame tube 42. When viewed endwise, as in Fig. 8, surfaces 43 and 44 serve as continuations of the cylindrical surface 41 and are aligned therewith so that a tube 42, when inserted into the boss 37, contacts both the inner surface 41 of boss 37 and the depressed surfaces 43 and 44.

It may be observed that each joint shown in Figs. 7 to 10 inclusive, like those of Figs. 1 to 6 inclusive, forms a mechanical lock which will resist twisting or bending forces of one tube relative to another irrespective of the presence or absence of any bonding metal between the adjacent surfaces of said tubes. For rigidity and to fix a frame tube longitudinally relative to the head tube, said tubes are united preferably by brazing or the like. It may be observed that in this modified form of my invention, relatively large areas of contact are provided between each frame tube and the head tube which effectively provides a very strong brazed joint.

Each boss such as 37 is preferably formed by lancing the flat blank to form the ends 39 and 40 on the boss and then bending and drawing the portion between the two cuts outwardly from the surface of the blank until the boss 37 is formed. The blank may then be curled into cylindrical form and the abutting ends of the blank united by brazing or welding.

In both forms described herein, the location of the axis of a frame tube to be received in a boss 37 relative to the surface of the tube 36 may be varied to suit particular conditions. In the latter form, as in the other, because of the insertion of a steering post 21 in tube 36, the axis of frame tube 42 is made to lie outside the normal outer surface of tube 36 to provide suitable clearance between the depressed portions 43 and 44 and the steering post 21.

It is understood that there are many ways available in the metal working art by which the head tube 36 and its bosses 37 may be formed. Thus, instead of starting with a single flat blank, two half sections of a tube may be used which are formed with the bosses 37 and subsequently welded together to form a unitary whole.

Where appearance is a factor, as in the case of a bicycle, the ends of the frame tubes 42 are closed, preferably by the formation of a semi-spherical end surface 45 thereon. If appearance is not a factor, however, tube 42 may be left open. The amount by which the tube 42 extends through the boss 37 depends upon the purpose for which the joint is made. Obviously, in the form shown in Figs. 7 to 10, there is no limitation on the length of tubing which may extend to the left of the boss 37, as viewed in Fig. 7, and in fact where tube 36 represents an intermediate structure in a scaffold or other tubular framework, the axis of the tube 42 may be joined to other tubes similar to tube 36 and the boss 37 may then comprise merely an intermediate support for said tube 42.

It is understood that the foregoing description is merely illustrative of two embodiments of the present invention and that the scope of the invention, therefore, is not to be limited thereto but is to be determined by the appended claims.

Having thus described my invention, what I claim as new and desire to secure by Letters Patent of the United States is:

1. A structure fabricated from a plurality of tubular elements, said structure comprising a first tubular element, a second tubular element, a boss extending radially outwardly from the tubular surface of the first element, a depression extending radially inwardly of the tubular surface of the first element and located adjacent the boss, said boss and depression being curved around aligned axes to receive the second tubular element, with one side of the second tubular element contacting the inside of the boss and the opposite side contacting the outside of the depression, and a bonding means at the juncture of the surfaces of the second tubular element and the boss and depression and uniting said first and second tubular elements.

2. A structure as defined in claim 1, said boss being closed at one end, and the end of the second tubular element being open and protected by the closed end of the boss.

3. A structure as defined in claim 1, said first tubular element being larger in diameter than the second tubular element, and the surfaces of the first tubular element in contact with the second tubular element defining an opening having the same shape as the outer surface of the second tubular element in contact therewith.

4. A structure as defined in claim 1, said boss being open at both ends, and the end of the second tubular element being closed and extending through one of the said open ends.

5. A structure fabricated from a plurality of tubular elements, said structure comprising a first tubular element, a second tubular element, a boss formed on the surface of the first element and partially defining a circular opening, the axis of which is disposed transversely of the axis of said first tubular element, a depression formed on the surface of the first tubular element in proximity to the boss, said depression defining another part of said circular opening, said second tubular element being received in the boss and contacting the inner surface of the boss and also contacting the outer surface of the depression, and means for securing the first and second tubular elements together.

6. A structure fabricated from a plurality of tubular elements, said structure comprising a first tubular element, a pair of tubular elements one disposed on each side of the first tubular element, a portion of the sides of said first tubular element being deformed and extended radially from the surface of said first tubular element to embrace the pair of tubular elements, and another portion adjacent the first portion being depressed radially inwardly and providing surfaces against which the pair of tubular elements can bear, and means for securing the tubular elements together.

7. A structure as defined in claim 6, and a cylindrical member mounted substantially concentrically within the first tubular element and free to rotate therein, said member extending past the depressed portions and being free thereof.

References Cited in the file of this patent

UNITED STATES PATENTS

| | | |
|---|---|---|
| 2,580,118 | Mercier | Dec. 25, 1951 |
| 2,669,729 | Stader | Feb. 23, 1954 |

FOREIGN PATENTS

| | | |
|---|---|---|
| 8,835 | Great Britain | Apr. 18, 1904 |